UNITED STATES PATENT OFFICE.

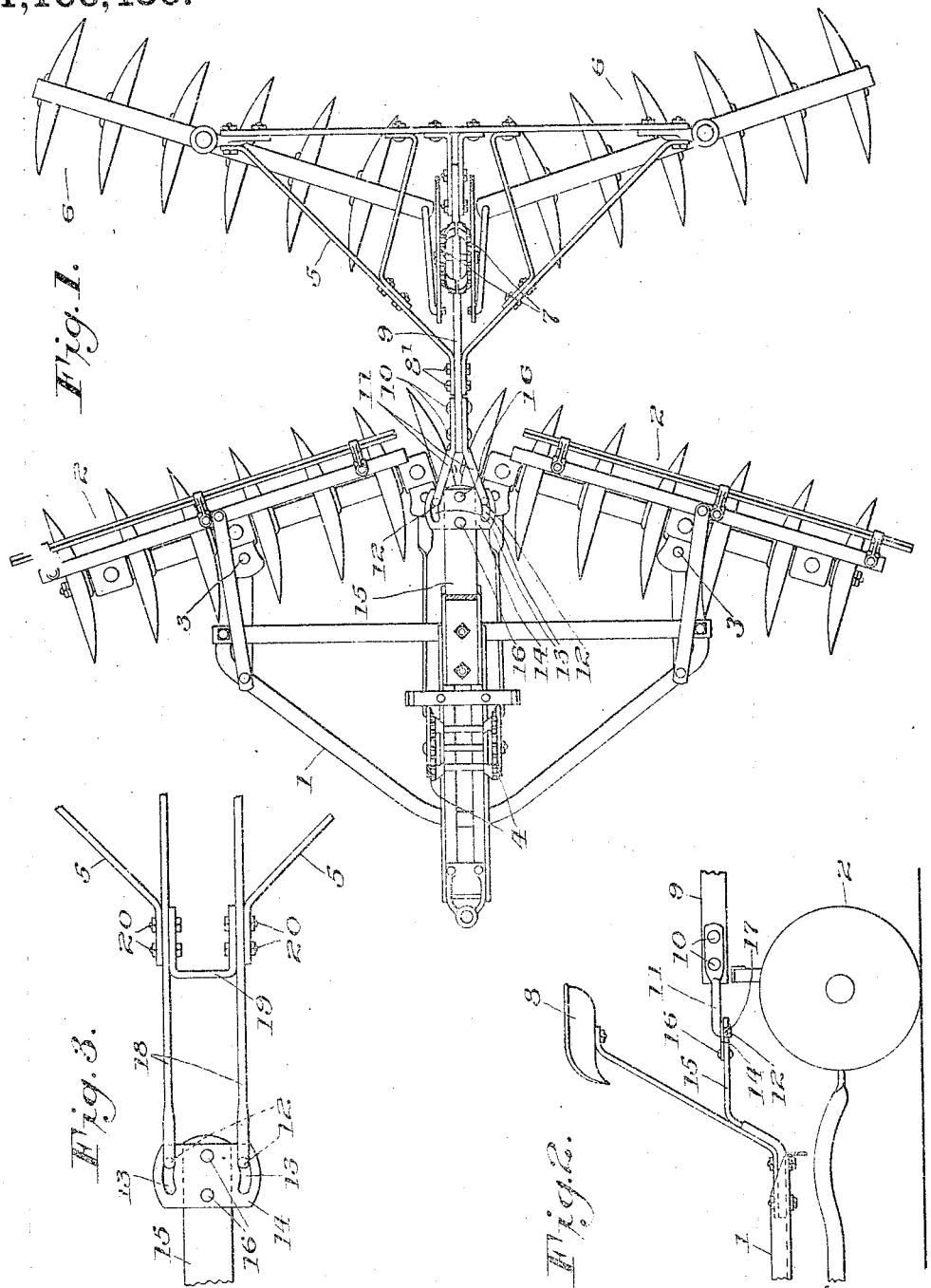

CHARLES S. SHARP, OF AUBURN, NEW YORK, ASSIGNOR TO INTERNATIONAL HARVESTER COMPANY OF NEW JERSEY, A CORPORATION OF NEW JERSEY.

TANDEM HARROW.

1,166,486.

Specification of Letters Patent.

Patented Jan. 4, 1916.

Application filed August 29, 1913. Serial No. 787,266.

*To all whom it may concern:*

Be it known that I, CHARLES S. SHARP, a citizen of the United States, residing at Auburn, in the county of Cayuga and State of New York, have invented certain new and useful Improvements in Tandem Harrows, of which the following is a full, clear, and exact specification.

My invention relates to tandem harrows. It has for its object to improve and simplify the construction of such harrows.

A more specific object of my invention is to improve the connection between the front and rear gang members thereof in such a manner that the latter is maintained in the desired relation to the front gang, either during the turning of the device or when operating on a side hill, and all buckling, straining, etc., of the frames and draft connections are eliminated.

I attain these objects by the provision of an automatically adjustable draft connection of improved construction hereinafter described.

In the accompanying drawings I have illustrated two embodiments which my invention may assume in practice. It is, however, to be understood that the forms shown herein may be modified without departing from the spirit of my invention.

Figure 1 is a top plan view of a tandem harrow equipped with one form of my improvement. Fig. 2 is a side elevation of a portion of the harrow illustrated in Fig. 1, showing the draft connection therefor. Fig. 3 is a top plan view of a modified form of the same construction.

In the first embodiment shown herein, the front harrow frame 1 is provided with a plurality of disk gangs 2 pivotally connected at 3 to the rear end thereof in a well known manner and adjustable with respect to the line of draft through the usual lever and ratchet connections 4, while the frame 5 of the rear harrow is provided with similarly adjustable disk gangs 6 and is adjustable through similar lever connections 7 located at the rear of the operator's seat 8. Between the two harrow frames 1 and 5 my improved draft connection, hereinafter described, is employed.

As shown in Fig. 1, the frame 5 is substantially triangular in shape, the converging side members being brought together in a peak at the front where they are united by bolts 8' to a longitudinally extending rigid frame member 9 which protrudes beyond the ends of the side members. Bolted at 10 to opposite sides of the projecting end of this longitudinally extending frame member 9, is a plurality of forwardly extending diverging draft members or rods 11, which, in the embodiment shown in Fig. 1, diverge from each other in such a manner as to subtend an angle of substantially 45°. The forward ends of these members are preferably of round cross section and bent downward substantially at right angles at 12 in such a manner as to protrude through and be freely movable in a plurality of oppositely disposed arcuate slots 13 formed on opposite sides of a horizontally disposed attachment plate 14, which in turn carried on a support 15 protruding rearwardly from the front frame 1 at a point substantially beneath the seat 8, and is rigidly attached to this support by means of any suitable bolt connection 16. As shown in Fig. 2, disengagement of these draft members from the slots is effectually prevented by means of cotter pins 17 extending through the downturned ends 12 thereof.

In Fig. 3 I have shown a modification of the construction shown in Fig. 1, wherein, instead of using diverging rods 11, the rods are projected parallel to each other, as shown at 18, and extend toward the rear of the tandem frame 5 in such a manner as to take the place of the frame member 9. It is to be noted that in this construction a horizontally disposed U-shaped bracing and spacing member 19 is employed, the arms of which are rigidly connected to the front ends of the frame member 5 by bolts 20, the same bolts serving to unite the frame members 5 and 18 to the U-shaped member 19. In this construction, as in the construction previously described, the forward ends of the members 18 move in arcuate slots 13 in a horizontally disposed plate 14 carried at the rear of the front frame 1.

In the operation of the construction shown when the front frame harrow (drawn along by any suitable means, as by horses or a tractor) is swung about on a turn, for instance, toward the left from the position shown in Fig. 1, only the outside draft rod or link 11 engages with the end of its slot, the other link traveling toward the opposite end of its arcuate slot, with the result that the tendency in turning the front gang is to swing the rear gangs around in an arc substantially the same as that described by the front gangs. It is further to be noted that due to the provision of the arcuate slots, the tendency of the device is to hold the rear gangs up at one side of the center in the line of draft when the harrow is working on a side hill, the result being to maintain the rear gangs in the desired relation with the front gangs.

In connection with the turning operation just described, it is to be noted that in turning in either direction one of the draft members 11 always acts as a draft member, tending to position the rear gangs in the desired relation to the front gangs, while the other draft member moves freely toward the opposite end of its slot, all tendency to buckle being thus eliminated. Attention is further directed to the fact that due to the provision of the slotted connection there is a flexibility of movement between the two gang members which enables the harrow to pass over rough ground without in any way interfering with its work or causing warping or undue dragging, and that when it is desired to disconnect the rear gangs, it is only necessary to remove the cotter pins 17 extending through the ends of the draft members or links 11. It is also to be noted that the construction is exceedingly sturdy, the parts being braced and united with the front draft members in such a manner as to form a rigid construction well adapted to withstand the strains and stresses of service.

While I have in this application described two embodiments which my invention may assume in practice, it is of course, to be understood that the forms shown herein for purposes of illustration may be modified without departing from the spirit of my invention.

What I claim as my invention and desire to secure by Letters Patent is:

1. In a double harrow, the combination of a front and rear frame, each carrying earth working devices, arms connecting said frames at each side of the line of draft, said arms each having a pivotal and sliding connection with one of said frames to permit said last mentioned frame to swing toward the other frame on either of said connections.

2. In a double harrow, the combination of a front and rear frame, each carrying earth working devices, arms rigidly connected to one of said frames at each side of the line of draft, said arms being pivotally and slidably connected to the other of said frames to permit said last mentioned frame to swing toward the other frame on either of said connections, substantially as described.

3. In a harrow of the class described, a front harrow section and a rear harrow section, the rear harrow section having a pair of reaches rigid therewith and the front harrow section having a plate with a pair of slots therein to receive the respective ends of the reaches.

4. In a tandem harrow, a front harrow, a rear harrow, one of said harrows having a plurality of arcuate slots therein, and a plurality of draft members carried by the other of said harrows having their free ends loosely engaged in said slots to permit movement of said members in intersecting planes.

5. In a tandem harrow, a front harrow, a rear harrow, one of said harrows having a plurality of oppositely disposed arcuate slots therein, and a plurality of longitudinally extending draft links carried on the other harrow having their free ends loosely engaged in said slots to permit movement of said members in horizontal and vertical planes.

6. In a tandem harrow, a front harrow, a rear harrow, a slotted horizontally disposed plate on one of the same, and longitudinally extending draft links rigidly attached to the other harrow and extending between said rear harrow and said front harrow having their free ends loosely engaged in the slots of said plate to permit movement of said links up and down and angularly.

7. In a tandem harrow, a front harrow, a rear harrow, a horizontally disposed plate carried on said front harrow having oppositely disposed arcuate slots therein, and a plurality of longitudinally extending draft members carried on said rear harrow having downwardly extending ends loosely engaged in said slots to permit lengthwise movement of said members and also a movement in a plane at right angles thereto.

8. In a tandem harrow, a front harrow, a rear harrow, a plurality of diverging draft members rigidly connected to said rear harrow having downwardly extending hooked ends, and a horizontally disposed plate carried on said front harrow having oppositely disposed arcuate slots therein in which the hooked ends of said draft members are received to permit the latter to move in intersecting planes.

9. In a tandem harrow, a front harrow having a rearwardly extending support, a horizontally disposed plate secured to said support having oppositely disposed arcuate slots on the opposite sides thereof, a rear harrow, and a plurality of forwardly protruding draft members rigidly attached to said rear harrow and disposed substantially in the plane thereof having downwardly extending projections on their front ends received in said slots and movable therein as said harrow is swung either laterally or vertically with respect to the front harrow.

10. In combination, a plurality of harrows disposed one in front of the other, and flexible tandem draft connections therefor comprising a member carried on one of said harrows having oppositely disposed arcuate slots therein, and longitudinally disposed draft members carried on the other harrow, having portions thereof movable longitudinally of said slots or about any point therein as an axis as said harrows move along a side hill or pass over uneven ground.

11. In a disk harrow, a front and rear frame, each having a pair of disk gangs pivotally mounted thereon on opposite sides of the median line of draft, members on the rear frame on opposite sides of the median line of draft, each connected to the front frame and capable of movement in a horizontal plane relative thereto.

12. In a disk harrow, a front and rear frame, each having a pair of disk gangs pivotally mounted thereon on opposite sides of the median line of draft, members on one of said frames on opposite sides of the median line of draft, each connected to the other frame and capable of movement in a horizontal plane relatively thereto.

13. In combination with front and rear harrow units employing disks, members rigid with one unit and movable in a horizontal plane with respect to the other unit connecting said units, each of said members being wholly on one side of the median line of draft.

14. In a double harrow, the combination of a front and rear frame, each carrying earth working devices, arms connecting said frames at each side of the line of draft, said arms each having a connection with one of said frames to permit of movement in a horizontal plane relative thereto and to permit one of said frames to swing toward the other frame on either of said connections.

In testimony whereof I affix my signature, in the presence of two witnesses.

CHARLES S. SHARP.

Witnesses:
H. J. McMahon,
Robert K. Forth.